United States Patent [19]

Kerns et al.

[11] Patent Number: 5,916,976
[45] Date of Patent: Jun. 29, 1999

[54] POLYMERS, ELASTOMERIC COMPOUNDS, AND PRODUCTS THEREOF, TERMINATED WITH NOVEL AMINE COMPOUNDS CONTAINING SIDE-CHAIN ORGANOHALIDE REACTIVE MOIETIES

[75] Inventors: Michael L. Kerns, Elyria; William L. Hergenrother, Akron; David F. Lawson, Uniontown, all of Ohio

[73] Assignee: Bridgestone Corporation, Tokyo, Japan

[21] Appl. No.: 09/001,823

[22] Filed: Dec. 31, 1997

Related U.S. Application Data

[63] Continuation of application No. 08/775,228, Dec. 31, 1996, Pat. No. 5,736,617.

[51] Int. Cl.[6] .................................................. C08F 8/16
[52] U.S. Cl. ............................ 525/332.8; 525/332.9; 525/333.1; 525/333.2; 525/359.4; 526/83
[58] Field of Search ........................... 525/332.8, 332.9, 525/333.1, 333.2, 359.4; 526/83

[56] References Cited

U.S. PATENT DOCUMENTS

| | | | |
|---|---|---|---|
| 3,109,871 | 11/1963 | Zalinski | 260/85.1 |
| 3,178,398 | 4/1965 | Strobel | 260/85.1 |
| 4,550,142 | 10/1985 | Akita | 525/236 |
| 4,734,461 | 3/1988 | Roggero | 525/293 |
| 4,735,994 | 4/1988 | Roggero | 525/279 |
| 4,737,554 | 4/1988 | Roggero et al. | 526/83 |
| 4,935,471 | 6/1990 | Halasa | 525/359.1 |
| 5,066,729 | 11/1991 | Stayer, Jr. | 525/315 |
| 5,112,929 | 5/1992 | Hall | 526/181 |
| 5,151,475 | 9/1992 | Stevens et al. | 526/83 |
| 5,153,159 | 10/1992 | Antkowiak | 502/155 |
| 5,332,810 | 7/1994 | Lawson | 540/450 |
| 5,496,940 | 3/1996 | Lawson | 540/450 |
| 5,527,753 | 6/1996 | Engel | 502/155 |
| 5,567,815 | 10/1996 | Hall | 540/541 |
| 5,574,109 | 11/1996 | Lawson | 525/280 |

FOREIGN PATENT DOCUMENTS

| | | |
|---|---|---|
| 0207559 | 6/1986 | European Pat. Off. . |
| 0212693 | 6/1986 | European Pat. Off. . |
| 0316255 | 10/1988 | European Pat. Off. . |

OTHER PUBLICATIONS

"Preparation of Some Triakyl Tin–Lithium Compounds", *J. Am. Chem. Soc.* 75, Gillman et al., 2507–2509, (1953).
"Preparation and Reactions of Trialkyltinlithium", by Tamborski et al., pp. 237–239, (1963).
"An Improved Synthesis of p–dimethylaminophenyl––lithium", by Hallas and Waring, *Chemistry and Industry*, pp. 620, (May 1969).
Riddick et al., *Organic Solvents*, 3rd Edition, Wiley–Inter. Science, N.Y., pp. 52–53, (1970).
"Functionally Substituted Organolithium Compounds. The Lithium Derivatives of Dimethylbenzylamines", C.T., by Viswanathan et al., *J. Organometallic Chem.*, pp. 1–7, 54, (1973).
"Anionic Polymerization VII. Polymerization and Copolymerization with Lithium Nitrogen Bonded Initiator", by Cheng, *American Chem. Soc.*, pp. 513–528, (1981).
"Lithiation of N,N–diamethylmethallylamine", by Fitt et al., *J. Org. Chem.* 46, pp. 3349–3352, (1981).
D.H. Richards, D.M Service and M.J. Stewart, *Brit. Polym. J.* 16, p. 117, (1984).
"Styrene–Butadiene Rubbers", by Henderson, *Rubber Technology*, 3rd Ed., Van Nostrand Reinhold, N.Y., pp. 228–233, (1987).
P. Charlier, R. Jerome and P. Teyssie, *Macromolecules No. 23*, p. 1831, (1990).
K. Ueda, A. Hirao and S. Nakahama, *Macromolecules No. 23*, p. 939, (1990).
*British Polymer J.* 22, pp. 319–325, (1990).
"Recent Advances in Anionic Synthesis of Functionalized Elastomers Using Functionalized Alkyllithium Initiators" by Quirk et al., *Rubber Chemistry and Technology*, vol. 69, pp. 444–461, (1996).
"Anionic Polymerization of Dienes Using Homogeneous Lithium Amide (N–Li) Initiators", by Lawson et al., *Polymer Preprints*, 37(2), pp. 728–729, (1996).

*Primary Examiner*—Bernard Lipman
*Attorney, Agent, or Firm*—Daniel N. Hall

[57] ABSTRACT

A functionalized polymer comprising a polymer having at least one cyclic amine end group defined according to formula (I)

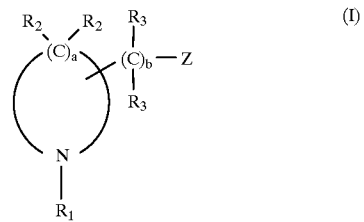

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

16 Claims, No Drawings

US 5,916,976

POLYMERS, ELASTOMERIC COMPOUNDS, AND PRODUCTS THEREOF, TERMINATED WITH NOVEL AMINE COMPOUNDS CONTAINING SIDE-CHAIN ORGANOHALIDE REACTIVE MOIETIES

This application is a continuation of U.S. Ser. No. 08/775,228, filed on Dec. 31, 1996.

TECHNICAL FIELD

The present invention generally relates to polymeric terminators and polymers terminated using the terminators. Specifically, the terminators are organohalide compounds. More specifically, the terminators are cyclic amines having an organohalide side-chain moiety. Polymers terminated with the compounds of the present invention exhibit improved characteristics such as improved compounding stability, improved hysteresis loss characteristics, and reproducible, relatively narrow range, molecular weight distributions.

BACKGROUND OF THE INVENTION

The formation of polymers by anionic polymerization is well known in the art. These polymers are typically achieved by the formation of the living polymer that reacts with monomeric segments. Completion of this polymerization process is generally achieved by terminating this living polymer. In other words, the living end is reacted with a terminating agent that quenches the polymerization process. Many terminating agents, which also include coupling or linking agents, are known in the art.

When conducting polymerizations on a commercial basis, it is important to utilize process conditions and components which will allow the molecular weight of the end products to be narrowly and reproducibly defined. The characteristics of a given polymer and its usefulness are dependent, among other things, upon its molecular weight. Hence, it is desirable to be able to predict with some certainty the molecular weight of the end product of the polymerization.

In the art, it is desirable to produce elastomeric compounds exhibiting reduced hysteresis characteristics. Such elastomers, when compounded to form articles such as tires, power belts and the like, will show an increase in rebound, a decrease in rolling resistance and will have less heat build-up when mechanical stresses are applied.

A major source of hysteretic power loss has been established to be due to the section of the polymer chain from the last cross link of the vulcanizate to the end of the polymer chain. This free end cannot be involved in an efficient classically recoverable process, and as a result, any energy transmitted to this section of the cured vulcanizate is lost as heat. It is known in the art that this type of mechanism can be reduced by preparing higher molecular weight polymers which will have fewer end groups. However, this procedure is not useful because processability of the rubber with compounding ingredients and during shaping operations decreases rapidly with increasing molecular weight.

It is also known in the art to reduce hysteresis loss by providing the end of the polymeric chain with a functional unit that will serve to anchor the free end and reduce hysteresis loss. For example, U.S. Pat. No. 5,552,473 to Lawson et al., teaches polymers initiated with one functional group and terminated with a second functional group. As a result, an elastomer is produced having greater affinity for compounding materials, such as carbon black, thereby reducing hysteresis loss.

More specifically, it is know in the art to employ amine containing compounds to terminate, and/or initiate, polymerization reactions and thereby provide the polymer with a functional unit suitable for reducing hysteresis loss. Based on the molecular structure of these amine containing compounds, the functional group is tethered to the polymeric chain via a nitrogen atom. Such compounds are generally described by Richards et al. in British Polymer Journal, volume 16, page 117, 1984; Charlier et al. in Macromolecules, volume 23, page 1831, 1990; and Ueda et al., Macromolecules, volume 23, page 939, 1990. As a result, these compounds have the potential of losing the incorporated amine through thermal, chemical or mechanical degradation.

Thus, there is a need in the art for improved amine containing anionic polymerization initiators and/or terminators.

SUMMARY OF INVENTION

It is therefore, an object of the present invention to provide anionic polymerization terminators that are capable of functionalizing a polymer.

It is a further object of the present invention to provide anionic polymerization terminators which, when bound to a polymer, have little or no tendency to loose their incorporated amine when subjected to thermal, chemical or mechanical degradation.

It is still a further object of the present invention to provide polymers having an amine containing functional end group with little or no tendency to loose the incorporated amine through thermal, chemical or mechanical degradation.

It is another object of the present invention to provide a method for terminating an anionic polymerization using an amine containing terminator, the terminator functionality having little or no tendency to loose the incorporated amine when subjected to thermal, chemical or mechanical degradation.

It is a further object of the present invention to provide vulcanizable elastomeric compounds including functionalized polymers and copolymers having improved stability.

It is yet another of object of the present invention to provide a functionalized polymer that, upon curing or vulcanization, demonstrates improved hysteresis loss.

It is still another object of the present invention to provide improved tires formed from polymers as described hereinabove.

At least one or more of the foregoing objects, together with the advantages thereof over the known art relating to the termination of polymers and copolymers, which shall become apparent from the specification which follows, are accomplished by the invention as hereinafter described and claimed.

In general, the present invention provides a method of terminating a living polymer comprising the step of reacting with a living polymer a terminator defined according to formula (I)

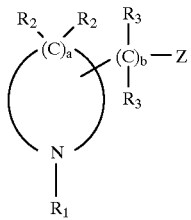

where Z is a halogen atom; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

The present invention further provides a functionalized polymer comprising a polymer having at least one cyclic amine end group defined according to formula (I)

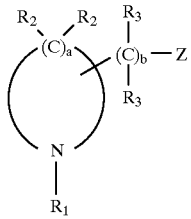

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

The present invention also provides a vulcanizable composition of matter comprising a polymer, having at least one cyclic amine end group, defined according to formula (I)

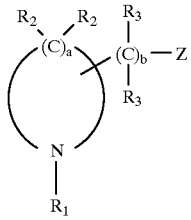

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

The present invention still further provides a vulcanizate comprising at least one polymer defined according to formula (I)

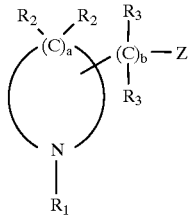

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members; said polymer having been crosslinked.

The present invention also provides a tire comprising at least one component containing a polymer, having at least one cyclic amine end group, defined according to formula (I)

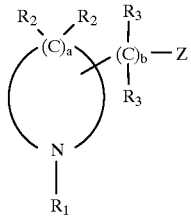

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

PREFERRED EMBODIMENT FOR CARRYING OUT THE INVENTION

As will become apparent from the description that follows, the present invention provides novel cyclic amine molecules, and compounds thereof, having an organohalide side-chain. The molecules are useful for, among other things, terminating the chain propagation of living polymers. These living polymers are typically those resulting from anionic polymerization techniques. These novel molecules, and compounds thereof, will simply be referred to as terminators for purposes of this disclosure. It should be further understood, that the use of the terms terminate and functionalize will interchangeably refer to the treatment of living polymers with the molecules of the present invention.

It has been discovered that vulcanizable polymers, such as vulcanizable elastomers, which are functionalized with terminators of the present invention, exhibit useful properties, including the ability to be processed or used without objectionable odors or with minimum release of amines. Additionally, polymers functionalized with terminators according to the present invention result in compounds demonstrating improved hysteresis loss upon curing or vulcanization.

Throughout this application, reference will be made to the variable Z. Based on the embodiment being discussed, Z will be defined in a manner consistent with that embodiment, and therefore, Z should be interpreted in view of each different embodiment. Inasmuch as one embodiment of the present invention deals with molecules useful for terminating chain-polymerization, Z will be defined as a halogen such as chlorine or bromine. In view of the embodiment teaching a terminated polymer chain, Z will be defined as a polymeric segment with an optional functional group at its initiated end, also referred to as the head of the polymer.

The molecule of the present invention contains a cyclic organo amine having an organohalide functionality branching from one of at least four carbon atoms within the cyclic amine ring. For purposes of this disclosure, the organohalide functionality, which branches from one of at least four carbon atoms, will be referred to as the organohalide side-chain. Specifically, the preferred molecule of the present invention is defined by formula (I)

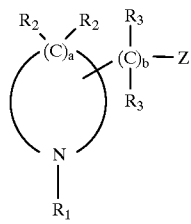
(I)

where Z is a halogen atom; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members. It should be appreciated that each $R_2$ and $R_3$ are of the same scope with the exception that $R_2$ can provide a bridging bond, however, $R_3$ is preferably hydrogen or a short organic group containing from 1 to about 3 carbon atoms. The halogen atom is preferably chlorine or bromine, and is most preferably chlorine.

With reference to formula (I), it should be understood that the amino ring can contain up to 16 ring carbon atoms in addition to the ring nitrogen, thereby forming a 17 member ring. Further, the organolithium side-chain, or Z containing moiety, can be joined to the amino ring at any of the up to 16 carbon atoms within the ring. Those of ordinary skill in the art will appreciate that the attachment of the Z containing moiety will take the place of one of the $R_2$ substituents at the tethered carbon.

With reference to those substituents that are independently selected, it should be understood that each substituent is separately selected without reference to any other substituent. For example, where a is 4, seven of the $R_2$s can be hydrogen atoms while the eighth can be an ethyl moiety. Likewise, where b is 3, five of the $R_3$s can be hydrogen atoms while the sixth can be a methyl moiety.

Regarding the use of the bridging bond, it should be appreciated that compounds represented by formula (I) can include multi-cyclo compounds such as bicyclo and tricyclo compounds. It should be understood that two bridging bonds will contribute to the formation of a bridge between two ring members, i.e. two ring carbons or one ring carbon and the ring nitrogen. Where there is a direct bond between two ring members, it is believed, without wishing to be bound to any particular theory, that the $R_1$ and $R_2$ variables simply represent an electron contributed to the bridge, which is a direct bond between ring members. Where the bridge formed between ring members includes an organic group, it should be understood that $R_1$ and $R_2$ provide a bonding site where the bridge is joined to the ring; again, probably via the contribution of an electron. In view of this teaching, the use of the term substituent, as it relates to $R_1$ and $R_2$, should be interpreted so as to include atoms, organic moieties and bonding sites or electrons.

As an example, two $R_2$ bridging bonds can form a bridge across the cyclic amino ring, and thereby create a bicyclo compound. This bridge between two ring carbons can include 0 carbon atoms, in which case there is a direct bond between ring carbons. The bridge can also include up to about 6 carbon atoms, in which case the bridge comprises an organic group. Those of ordinary skill in the art will understand that inasmuch as a $R_2$ substituent contributes to a bridge, it will no longer be available as a hydrogen or organic group extending from the ring.

It should also be understood that a bridge can be formed between the ring nitrogen and a ring carbon. Those of ordinary skill in the art will appreciate that this bridge will be formed between the $R_1$ associated with the nitrogen and a $R_2$ of a ring carbon. This bridge can contain 0 carbon atoms, in which case there is a direct bond between the ring nitrogen and the ring carbon, or up to 6 carbon atoms, in which case the bridge comprises an organic group. It should also be understood that the cyclic structure defined by formula (I) can include more than one bridge.

For example, the bicyclo compounds that are generally defined by formula (I) can more specifically be represented by formulas (II) and (III)

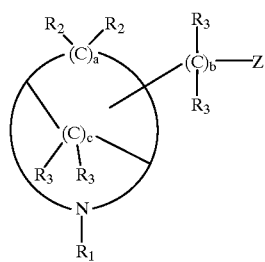

(II)

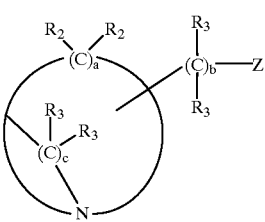

(III)

where the variables Z, $R_1$, $R_2$, $R_3$, a and b are as defined herein. Formula (II) represents a bicyclo compound wherein a bridge is formed between two ring carbons. The bridge length is defined by c, which is an integer between 0 and about 6. It should be appreciated that the Z containing moiety can extend from any carbon within the ring, including those carbons that may be in the bridge. Accordingly, it should also be understood that the Z containing moiety can be tethered to the bicyclo compound in the one ring, which contains the nitrogen, or in the adjacent ring. Formula (III) represents a bicyclo compound where a bridge is formed between the ring nitrogen and a ring carbon. The bridge length is again defined by c, which is an integer between 0 and about 6. As with formula (II), the Z containing moiety can extend from any of the carbon atoms within the ring, including those carbon atoms that may be in the bridge. It should be understood that the $R_1$ is not depicted in formula (III) inasmuch as it is part of the bridge. The same holds true for $R_2$, but each individual carbon, and associated $R_2$, is not represented in the formulas so as to facilitate depiction of the molecule.

The organic groups defined herein can contain unsaturation, but are preferably branched, straight chain, or cyclic alkyl groups. It should be further understood that the organic groups can contain hetero atoms including oxygen, sulfur and nitrogen. For example, the organic groups of the present invention can include tertiary amines, simple alkyl or alkenyl, cycloalkyl or cycloalkenyl, bicycloalkyl or bicycloalkenyl, or aralkyl groups, and their non-interfering oxygen, nitrogen, and sulfur containing analogs. Examples of such groups include dialkylaminos or dialkylaminoalkyls. Although the preceding examples of possible organic radical groups have been recited, the scope of the invention should not be limited thereto.

Some examples of the above defined terminators of the present invention can be more specifically represented by formulae such as; (A), (B), (C), (D), (E), (F), (G), (H), (I), (J), (K) and (L).

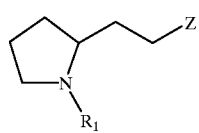

(A)

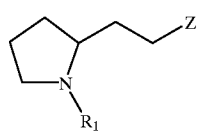

(B)

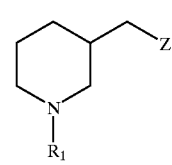

(C)

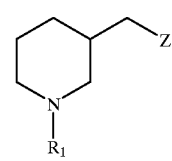

(D)

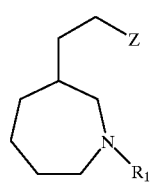

(E)

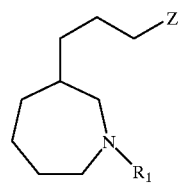

(F)

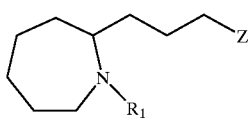

(G)

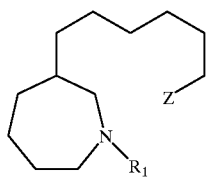 (H)

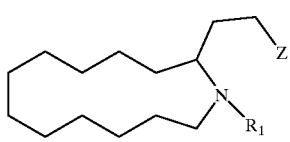 (I)

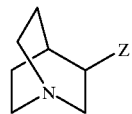 (J)

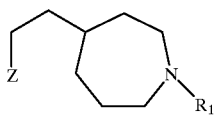 (K)

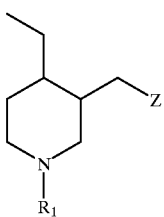 (L)

wherein Z is a halogen atom; and $R_1$ is an organic group containing from about 1 to about 12 carbon atoms. Preferably, $R_1$ is an alkyl organic group, and most preferably a methyl group. It is also preferred that the halogen atom comprise a primary chlorine or bromine, bound to the side-chain.

The terminators according to the present invention can be formed by a number of techniques, employing a variety of conditions, and using various hydrocarbon solvents. It should further be appreciated that the use of polar solvents may be necessary, alone or in conjunction with the hydrocarbon solvents, for improved solubility of the terminator reagent, provided that the solvents are compatible with anionic polymerizations and the solvent recovery in polymer drying procedures.

The present invention further provides novel compositions that are produced by treating living polymers with the terminators of the present invention. A living polymer is a polymeric segment having a living or reactive end. For example, when a lithio containing initiator is employed to initiate the formation of such a polymer, the reaction will produce a reactive polymer having a lithium atom at the living or reactive end thereof.

Upon functionalization employing a terminator of the present invention, the resulting polymer will contain an amine-functional unit incorporated at the terminal or tail end of the polymer. The amine-functional unit, derived from the terminator of the present invention, will provide the polymer with a moiety having unshared electron pairs that can bind to other constituents. That is, the amine-functional unit is a Lewis base that can react with Lewis acids such as carbon black. The resulting polymers, therefore, are useful for producing such articles as tires where the amine-functional unit can bind to carbon black and serve to reduce hysteresis loss. It should be appreciated that some of these polymers may also be useful as reduced hysteresis materials when compounded with other appropriate ingredients.

An advantage provided by use of the terminators of the present invention is that the amine functionality becomes strongly tethered to the polymer chain and is therefore less likely to become separated from the polymer during compounding operations wherein vulcanizable elastomeric compounds are formed. Subsequent to vulcanization, the desired reduction in hysteresis loss possessed by the compound is thereby insured as loss of amine functionality is minimized, if not substantially eliminated. Hysteresis loss reductions of at least 10 to 20 percent, and higher, are useful and obtainable by practice of the present invention.

Living polymers that have been functionalized with the terminators of the present invention can be defined by the formula (I), hereinabove, where Z is a polymeric unit; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members. The organic groups are as defined hereinabove and each $R_3$ is preferably hydrogen or a short organic group containing from 1 to about 3 carbon atoms. The polymer is any anionically-polymerized polymer including, for example, those derived form diene homopolymers, monovinyl aromatic polymers, diene/monovinyl aromatic random copolymers and block copolymers.

Specifically, the polymers that have been functionalized with some of the terminators according to the present invention can be represented by the formulae: (A)-(L), hereinabove, where Z is a polymeric unit; and $R_1$ is an organic group containing from about 1 to about 12 carbon atoms. Preferably, $R_1$ is an alkyl organic group, and most preferably a methyl group.

Accordingly, a polymer that has been initiated using a functionalized initiator and terminated using a functionalized terminator, according to the present invention, can be defined by the formula (IV)

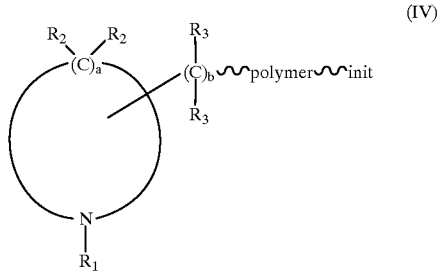

(IV)

where init is a functionalized moiety resulting from an initiator; $R_1$, $R_2$, $R_3$, a and b are as described hereinabove, and wherein the polymer can include any anionically-polymerized polymer.

In a preferred embodiment, the initiator moiety init, is a cyclic amine having an organo side-chain. The polymers of this preferred embodiment can be defined according to formula (V)

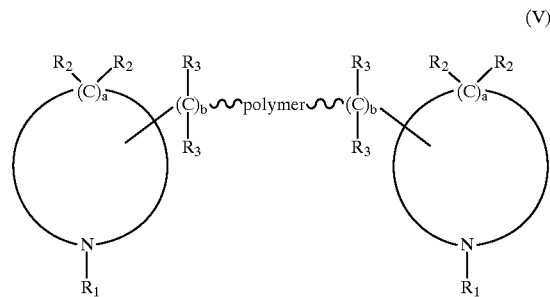

(V)

where the polymer is any anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

With regard to formula (V), it should be understood that the head or tail of the polymer can be the same or different, and thus, one skilled in the art, in view of this disclosure, will be able to synthesize the polymers with the desired functionality either at the head or the tail of the polymer, or both.

Furthermore, it should be appreciated that the preferred polymers of the present invention can include formulae (A)-(L), hereinabove, where Z is a polymeric unit having an initiator moiety, such as init above, and where the initiator moiety can include structures from formulae (A)-(L), where Z is a polymeric unit having a terminal end according to the teachings of the present invention.

It should be appreciated that the polymeric unit or anionically-polymerized polymer, identified above, can include any polymeric unit, e.g., homopolymers of polybutadiene, polyisoprene and the like, and copolymers thereof with monovinyl aromatics such as styrene, alpha methyl styrene and the like, or trienes such as myrcene, and mixtures of the foregoing. Typically, the polymeric unit is an anionically-polymerized polymer. Suitable monomers include conjugated dienes having from about 4 to about 12 carbon atoms, monovinyl aromatic monomers having 8 to 18 carbon atoms and trienes. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, alpha-methylstyrene, p-methylstyrene, vinyltoluene and vinylnaphthalene. The conjugated diene monomer and aromatic vinyl monomer are normally used at the weight ratios of 95-50:5-50, preferably 95-65:5-35, respectively.

It should be understood that the living polymers terminated according to the present invention can be prepared using any known polymerization technique, including polymerizations that are initiated with any known anionic initiator. Such initiators can include, but are not limited to, alkyllithium initiators, arenyllithium or arenyl-sodium compounds, or functional initiators such as N-Li dihydrocarbon amide, aminoalkyl lithiums, and alkyltin lithium. Other initiators include N-lithio dihydrocarbon amides, such as N-lithio hexa-methyleneimide, N-lithio-pyrrolidinide, N-lithio dodecamethylene-imide. Exemplary initiators are also described in U.S. Pat. Nos. 5,153,159; 5,268,439; 5,274,106; 5,238,893; 5,332,810; 5,329,005; 5,578,542; 5,393,721; 5,491,230; 5,521,309; 5,496,940; 5,574,109; 5,523,364; 5,527,753; and 5,550,203. A preferred polymer is that initiated with a side-chain organolithium initiator, which is described in our copending application entitled "Polymers, Elastomeric Compounds and Product Thereof, Derived From Novel Amine Reagents Containing Side-Chain Organolithium Reagents." (Attorney Docket No. 9605023).

Polymerization is typically conducted in polar or non-polar solvent, such as tetrahydrofuran (THF), a hydrocarbon solvent, such as the various cyclic and acyclic hexanes, heptanes, octanes, pentanes, their alkylated derivatives, and mixtures thereof. In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units. The molecular weight of the polymer ("base polymer") that is produced in this invention is optimally such that a proton-quenched sample will exhibit a gum Mooney (ML/4/100) of from about 1 to about 150. However, useful lower molecular weight compounds can also be employed. These might typically be considered fluids, having molecular weights ranging from several hundreds to tens of thousands of mass units. They can be used as viscosity modifiers and as dispersants for particulates, such as carbon black in oil.

The molecular weight of the polymer ("base polymer") that is produced in this invention is optimally such that a proton-quenched sample will exhibit a gum Mooney (ML/4/100) of from about 1 to about 150. However, useful lower molecular weight compounds can also be made using these initiators. These might typically be considered fluids, having molecular weights ranging from several hundreds to tens of thousands of mass units. They can be used as viscosity modifiers and as dispersants for particulates, such as carbon black in oil.

Polymers terminated according to the present invention can be of any molecular weight, depending on the intended application. Generally, for purposes of making tire products, the molecular weight of the polymer should fall within the range from about 50,000 to about 1,000,000, preferably from 80,000 to about 500,000, and most preferably from about 100,000 to about 250,000. When used as a viscosity modifier, the molecular weight of the polymer should generally fall within the range from about 500 to about 50,000, preferably from about 1,500 to about 30,000, and most preferably from about 2,000 to about 15,000.

Other compounds useful as polar coordinators are organic and include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, owned by the Assignee of record, the subject matter of which relating to such modifiers is incorporated herein by reference. Compounds useful as polar coordinators include those having an oxygen or nitrogen hetero-atom and a non-bonded pair of electrons. Other examples include dialkyl ethers of mono and oligo alkylene glycols; "crown" ethers; tertiary amines such as tetramethylethylene diamine (TMEDA); linear THF oligomers; and the like.

Typically, a batch polymerization is begun by charging a blend of monomer(s) and normal alkane solvent to a suitable reaction vessel, followed by the addition of the polar coordinator (if employed) and the initiator compound previously described. The reactants are heated to a temperature of from about 20 to about 200° C., and the polymerization is allowed to proceed for from about 0.1 to about 24 hours. This reaction produces a reactive polymer having a lithium atom at the living end thereof.

The terminating reagent is added to the reaction vessel, and the vessel is agitated for about 1 to about 1000 minutes. As a result, an elastomer is produced having an even greater affinity for compounding materials such as carbon black, and hence, even further reduced hysteresis.

The polymer may be separated from the solvent by conventional techniques. These include steam or alcohol coagulation, thermal desolventization, or any other suitable method. Additionally, solvent may be removed from the resulting polymer by drum drying, extruder drying, vacuum drying or the like.

The polymers that are terminated according to the present invention comprise a plurality of polymer molecules having a functional group, including a tertiary amine, at the tail of the polymer, i.e. the end of the polymer that is terminated. Preferably, the polymer has a functional group at both the tail and the head of the polymer, and more preferably a functional group at both the head and tail including a tertiary amine. It should be understood that a functional group is typically incorporated into the head of the polymer as a result of the initiator used to form the polymer. Thus, it is most preferred to initiate a polymer using an initiator that will leave a tertiary amine at the head and terminate the polymerization with a terminator that will leave a tertiary amine, according to the present invention, in the tail of the polymer. Compounding such elastomers results in products exhibiting improved stability and reduced hysteresis loss, which means a product having increased rebound, decreased rolling resistance and has less heat build-up when subjected to mechanical stress.

The living polymer may also be partially coupled with any of the various known coupling reagents, such as silicon tetrachloride, tin tetrachloride, etc., to prepare symmetrically "dicapped" polymers. By partially coupling, it is meant that up to about 70 mole percent of the composition is coupled, preferably from about 10 to about 60, and more preferably from about 20 to about 50 mole percent of the composition is coupled. Typically, this can be achieved by treating the living polymer with between about 0.1 and 0.7 equivalents of a coupling agent per equivalent of lithium prior to termination of the polymerization.

By the end-linking of polymers initiated with lithium hydrocarbon amides, through reaction with for example, $(R_5)_e SnQ_f$; $SnCl_4$; or $C_4H_9SnCl_3$; to obtain products with substantially greater than 10 percent end-linking through tin, especially desirable elastomeric compositions with low hysteresis properties are prepared. $(R_5)_e SnQ_f$ is defined where $R_5$ is selected from the group consisting of alkyls, cycloalkyls, alkenyls, aryls and aralkyls having from 1 to about 20 carbon atoms and short chain length low molecular weight polymers from diolefin and vinyl aryl monomers having up to about 25 units, and Q is chlorine or bromine, e is from about 0 to about 3 and f is from about 1 to about 4; where e+f equals 4. Such partially coupled elastomers combine the effectiveness of the terminators of this invention with the benefits of end-linking or star-branching, and may exhibit improved finishing or processability.

The polymers made and terminated according to the teachings of the present invention can be used alone or in combination with other elastomers to prepare a product such as a tire treadstock, sidewall stock or other tire component stock compound. Such stocks are useful for forming tire components such as treads, subtreads, black sidewalls, body ply skims, bead fillers and the like. At least one such component is produced from a vulcanizable elastomeric or rubber composition. For example, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, poly (chloroprene), ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight of the former.

The polymers can be compounded with carbon black in amounts ranging from about 20 to about 100 parts by weight, per 100 parts of rubber (phr), with about 40 to about 70 phr being preferred. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks.

Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

| CARBON BLACKS | |
|---|---|
| ASTM Designation (D-1765-82a) | Surface Area (m²/g) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds used may be in pelletized form or an unpelletized flocculent mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric compositions made from the above elastomers can be prepared by compounding or mixing the polymers thereof with carbon black and other conventional rubber additives such as fillers, plasticizers, antioxidants, curing agents and the like, using standard rubber mixing equipment and procedures and conventional amounts of such additives. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol 20, pp. 365–468, particularly "Vulcanization Agents and Auxiliary Materials" pp. 390–402. Vulcanizing agents may be used alone or in combination. This invention does not affect cure times and thus the polymers can be cured for a conventional amount of time. Cured or crosslinked polymers will be referred to as vulcanizates for purposes of this disclosure.

GENERAL EXPERIMENTAL

In order to demonstrate the use of terminators of the present invention as well as the properties of the polymers functionalized there with, living polymers were functionalized with the terminators of the present invention.

The terminators of the present invention may be prepared under a variety of conditions, using various hydrocarbon solvents as discussed hereinabove. The terminators may be used in polymerizations using polar and nonpolar solvents as may be necessary for improved solubility of the terminator, provided that the solvents are compatible with anionic polymerizations and the solvent recovery in polymer drying procedures. In one preferred embodiment of the invention, the polymers are prepared in substantially hydrocarbon solvents, such as hexane, cyclohexane, and mixtures thereof.

For greatest stability, the terminators of the present invention are usually handled as their hydrohalide or hydrohydrogen sulfate salts, which are treated with base just prior to their use in the termination reaction, in order to liberate the free halo organo amines. This can be explained according to following exemplary reaction.

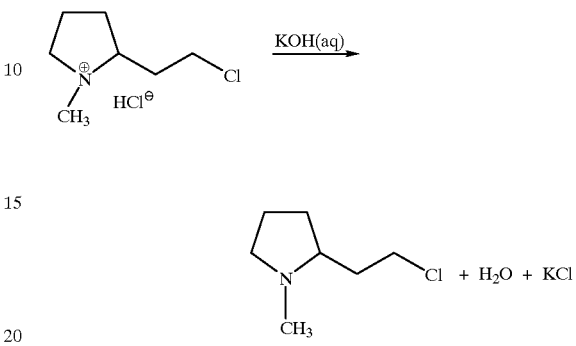

The initiator charging polymerization, and coupling and/or termination may be performed in one reaction vessel, or second or third reactor vessels, or transfer lines from the original reactor can be used, by introducing the preformed initiator to the monomer mixture, or vice-versa. Polymerization and post-treatment conditions should be used that avoid the introduction of air and/or protic or other reactive contaminants, such as moisture, etc., and prolonged heating or storage at excessive temperatures should be avoided unless the live ends are stabilized. Moderate temperatures (from about 0° C. to about 90° C.) are preferred for the polymerizations and the termination. Polymerization and post-treatment temperatures of from about 30° C. to 70° C. are preferred. The polymerization time may vary from a few minutes to days, depending on the temperature, solvent and presence of any donor solvent, the monomer structures, and the molecular weight desired.

Any suitable method for isolation of the terminated rubber or fluid may be used, for example: quenching with water, steam, an acid or an alcohol (these may be introduced during the desolventization step), and desolventization by drum drying, coagulation in alcohol, water or steam, extruder drying, vacuum drying, spray drying or any combination thereof. Desolventization by drum-drying, coagulation in alcohol, steam or hot water desolventization, extruder drying, vacuum drying, spray drying or combinations thereof are preferred. An antioxidant and/or antiozonant compound is usually added to the polymer or polymer cement at or before this stage. In most of the experimental examples of this invention, alcohol coagulation followed by drum-drying or vacuum drying were used.

Upon drying, the elastomers were compounded in a carbon black-filled test stock (see Low-Oil Test Recipe, TABLE II), and the physical properties determined in comparison to those of related base polymers without the modifications. In practice, a wide variety of compounding recipes may be used to give favorable results with this invention, although hysteresis properties may vary from formulation to formulation, depending on the type and amount of carbon black and oil used, and so on. Certain other fillers, such as silica or hydrated silica may also be useful. Furthermore, the polymers made with the initiators of this invention may be combined in proportions of 20 to 100 percent by weight with 80 to 0 percent by weight of other polymers to give elastomeric compositions with reduced hysteresis loss characteristics. The low molecular weight products made from the initiators of this invention may be used at low levels to influence the properties of mixtures with other fluids and/or particulates.

Low-Oil Test Formulation for Evaluation of Hysteresis:

TABLE II

| Ingredient | Mix Order | Parts per Hundred Parts of Rubber |
|---|---|---|
| Masterbatch: 145–155° C., 60 RPM, (drop after 5 min, @ 155–175° C.) | | |
| Polymer | 1 | 100 |
| Naphthenic oil | 2 | 10 |
| Carbon black, N-351 | 3 | 55 |
| ZnO | 4 | 3 |
| Antioxidant | 5 | 1 |
| Wax blend | 6 | 2 |
| Total Masterbatch: Final: 77–95° C., 40 RPM | | 171 |
| Stearic acid | | 2 |
| Sulfur | | 1.5 |
| Accelerator | | 1 |
| Total Final: | | 175.5 |

EXAMPLE 1

Termination of SBR-Li with 2-(2-chloroethyl)-methylpyrrolidine

A living polymer cement was prepared using n-BuLi initiator. 2-(2-Chloroethyl)-1-methylpyrrolidine hydrochloride was treated with excess NaOH solution and extracted into cyclohexane, and then dried over molecular sieves. The free 2-(2-chloroethyl)-1-methylpyrrolidine solution was added in a 1:1 (molar basis) to the living polymer cement, and the mixture was agitated for several hours at 50° C. The polymer was coagulated and drum-dried as indicated above. The polymer had 25% styrene, with Mn=121000, Mw/Mn=1.20. The polymer showed 73 mole % of bound amino content. The polymer was subsequently compounded with carbon black in the standard test recipe, as described hereinabove. The cured compound showed a tan δ of 0.101 in the Dynastat test at 50° C. This is about 40% lower than an unmodified SBR of the same molecular weight, and about on a par with an SBR that was prepared by end-linking the SBR-Li with $SnCl_4$.

EXAMPLE 2

Initiation with 2-(2-lithioethyl)-methylpyrrolidine and termination of (amino)-SBR-Li with 2-(2-chloroethyl)-1-methylpyrrolidine 2-(2-lithioethyl)-1-methylpyrrolidine was performed using a "one-pot" preparation. Free 2-(2-chloroethyl)-1-methylpyrrolidine was dissolved in cyclohexane. t-Butyllithium, dissolved in pentane (two equivalents) was then added. The resulting mixture was agitated gently at room temperature for one hour before using for polymerization. The mixture was titrated to determine active C-Li content, which was estimated at 0.15 M active Li; and measured at 0.113 M, with 0.17 total base.)

The mixture was used to initiate the polymerization of butadiene and styrene. The polymerization technique was similar to that described in Example 1. Specifically, a 0.113 M solution of the above initiator was added to a dried, sealed, nitrogen-purged bottle, through a Viton rubber cap liner, to a 75%/25% by weight blend of butadiene and styrene in hexanes, at an estimated level of 0.85 equivalent Li/100 g monomer. An additional amount of N, N, N', N'-tetramethylethylenediamine ("TMEDA") was added, and the mixture was agitated at 50° C. for 0.5 to 2.5 hr, proceeding to approximately 94–98% conversion to polymer. It should be appreciated that there is considerable leeway in the reaction times and temperatures, much the same as there is leeway in the reaction vessels, type of agitation, etc., used. The cement was then treated, by injection, with a free 2-(2-chloroethyl)-1-methylpyrrolidine solution, added in a 1:1 (molar basis) to the living polymer cement, and the mixture was agitated for several hours at 50° C. The cement was then quenched with 1.5 ml of i-PrOH, treated with an antioxidant (3 ml of a mixture containing 1.6 wt % DBPC in hexane), coagulated in i-PrOH, air-dried at room temperature, then drum-dried.

The following characterizations were determined using known techniques. The product had $M_n$=131000 daltons, MWD=1.22, with 87 mole % bound amino groups. Hysteresis measurements on the elastomer compounded in the low-oil test formulation, described hereinabove, showed tan δ of 0.097 at 50° C.

EXAMPLE 3

Initiation with n-butyllithium and termination of SBR-Li with 3-(chloromethyl)-1-methylpiperidine The procedure of Example 1 was followed in another polymerization. In this case the living SBR-Li cement was treated with a solution of 3-(chloromethyl)-1-methylpiperidine. After workup, the elastomeric product had $M_n$=130121 daltons, MWD=1.20, with 11 mole % bound amino groups. Hysteresis measurements on the elastomer compounded in the low-oil test formulation below showed tan δ at 50° C. of 0.144, which is 10–20% lower than that of an unmodified polymer of comparable molecular weight.

Thus it should be evident that the compounds and methods of the present invention are highly effective in terminating polymers. The invention is particularly suited for terminating anionic polymerizations, but is not necessarily limited thereto. The compound and method of the present invention can be used exclusively or with other terminators, coupling agents and the like.

Based upon the foregoing disclosure, it should now be apparent that the use of the terminators described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the polymers that are terminated or functionalized according to the present invention can include any polymer, living or otherwise, that can be reacted with the terminator. Thus, the scope of the invention shall include all modifications and variations that may fall within the scope of the attached claims.

What is claimed is:

1. A functionalized polymer prepared by:

terminating a living polymer with a terminator defined according to formula (I)

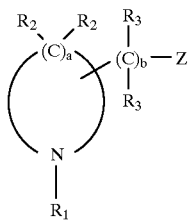

where Z is a halogen atom; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

2. A functionalized polymer, as set forth in claim 1, wherein $R_3$ is selected from the group consisting of hydrogen and organic groups containing from 1 to about 3 carbon atoms.

3. A functionalized polymer, as set forth in claim 1, wherein said cyclic amine having an organohalide sidechain is selected from the group consisting of tetrahydroazepine derivatives, azatridecane derivatives, pyrrolidine derivatives, piperidine derivatives, azabicyclooctane derivatives, and azabicyclononane derivatives.

4. A functionalized polymer, as set forth in claim 1, wherein said cyclic amine having an organohalide sidechain is 2-(2-chloroethyl)-1-methylpyrrolidine.

5. A functionalized polymer, as set forth in claim 1, wherein said cyclic amine having an organohalide sidechain is 3-(chloroethyl)-1-methylpiperidine group.

6. A functionalized polymer, as set forth in claim 1, wherein said halogen is selected from the group consisting of chlorine and bromine.

7. A functionalized polymer, as set forth in claim 1, wherein said living polymer is an anionically polymerized polymer.

8. A functionalized polymer, as set forth in claim 7, wherein said anionically-polymerized polymer is selected from the group consisting homopolymers and copolymers of dienes, trienes, vinyl aromatics, and mixtures thereof.

9. A functionalized polymer as set forth in claim 8, wherein said anionically-polymerized polymer has been initiated with an initiator that provides the head of the polymer with an additional functionality.

10. A functionalized polymer, as set forth in claim 9, wherein said initiator defined according to formula (I)

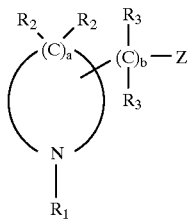

where Z is a lithium atom; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

11. A functionalized polymer, as set forth is claim 7, wherein the living polymer is treated with 0.1–0.7 equivalents of a coupling agent per equivalent of lithium prior to said step of reacting with the terminator.

12. A functionalized polymer, as set forth in claim 9, wherein said initiator is selected from the group consisting of N-lithio hexamethyleneimide, N-lithio pyrrolidineimide, N-lithio dodecamethyleneimide.

13. A functionalized polymer, as set forth in claim 11, wherein the polymer is defined according to formula (V)

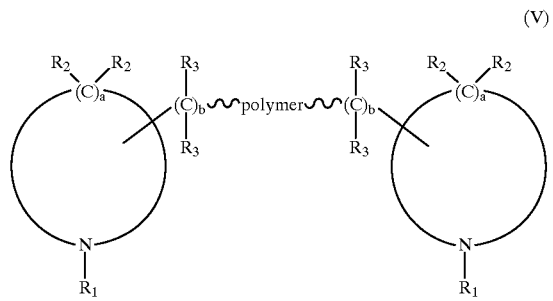

where Z is an anionically-polymerized polymer; $R_1$ is selected from the group consisting of organic groups containing from 1 to about 12 carbon atoms and a bridging bond; each $R_2$ is independently selected from the group consisting of hydrogen, organic groups containing from 1 to about 12 carbon atoms, and a bridging bond; each $R_3$ is independently selected from the group consisting of hydrogen and organic groups containing from 1 to about 12 carbon atoms; a is an integer from 4 to about 16; and b is an integer from 0 to about 12; and optionally including a bridge, formed by the selection of two of said bridging bonds, the bridge having 0 to about 6 carbon atoms between the bridging ring members.

14. A vulcanizable composition of matter comprising the functionalized polymer of claim 1.

15. A vulcanizate comprising the functionalized polymer of claim 1 that has been crosslinked.

16. A tire comprising the vulcanizate of claim 15.

* * * * *